United States Patent [19]

Kisner

[11] Patent Number: 4,961,604
[45] Date of Patent: Oct. 9, 1990

[54] COMBINATION STEP BUMPER AND HOIST APPARATUS

[76] Inventor: Richard L. Kisner, 11255 SW. Greenburg Rd., Apt. #15, Tigard, Oreg. 97223

[21] Appl. No.: 381,464

[22] Filed: Jul. 18, 1989

[51] Int. Cl.⁵ .............................. B60R 19/48
[52] U.S. Cl. ........................ 293/106; 293/117; 224/42.03 A; 212/180; 414/540
[58] Field of Search ............... 293/106, 117; 224/42.03 A; 212/180, 181; 414/540, 543

[56] References Cited

U.S. PATENT DOCUMENTS

| | | | |
|---|---|---|---|
| 1,509,800 | 9/1924 | Vogel | 212/180 |
| 3,139,198 | 6/1964 | Penney et al. | 212/181 X |
| 4,419,038 | 12/1983 | Pendergraft | 414/549 X |
| 4,674,782 | 6/1987 | Helber | 293/117 X |
| 4,746,263 | 5/1988 | Cook | 293/117 X |
| 4,806,063 | 2/1989 | York | 212/180 X |

OTHER PUBLICATIONS

"Iron Mule" Truck Bumper Brochure.

Primary Examiner—Dennis H. Pedder
Attorney, Agent, or Firm—Leon Gilden

[57] ABSTRACT

A combination step bumper and hoist apparatus is set forth wherein a step bumper is provided with a storage receptacle container mounting an overlying pivoted lid including a latch member to secure the lid to the storage bumper. The bumper includes plural pairs of spring latches to secure elongate post members therein wherein the post members may be assembled as a hoist organization. The hoist organization is received through an aperture within the lid aligned with a support cylinder formed at an intersection of a side wall and rear wall of the storage bumper.

3 Claims, 3 Drawing Sheets

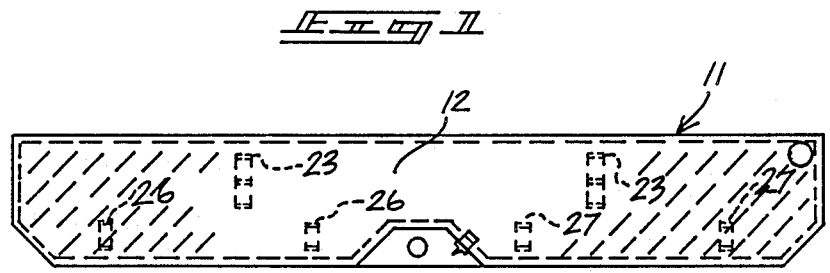
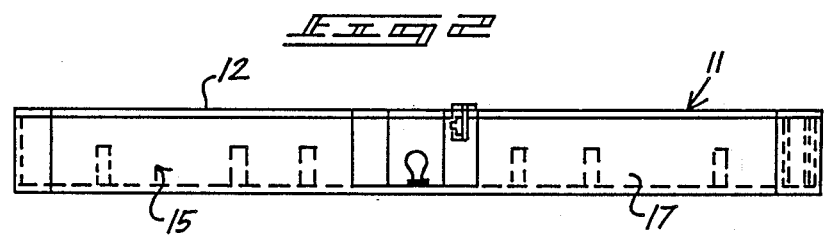

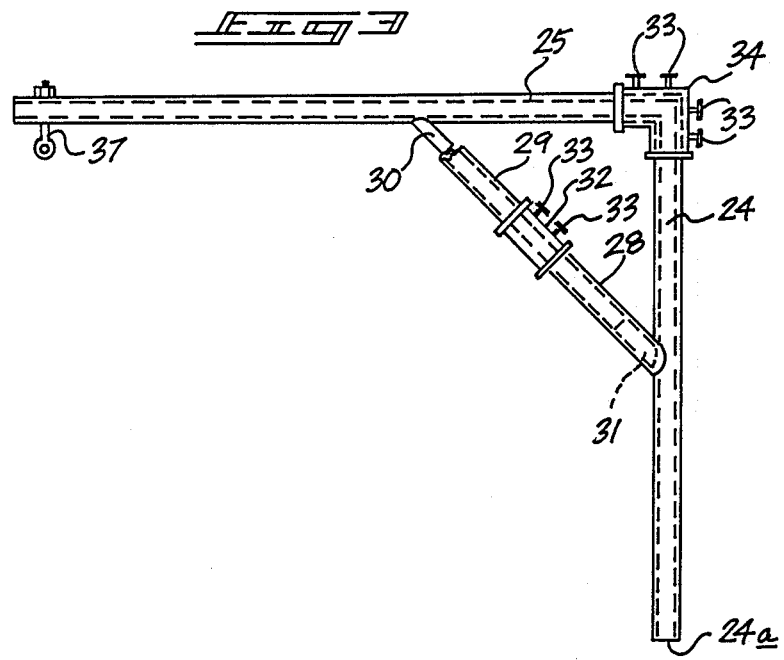
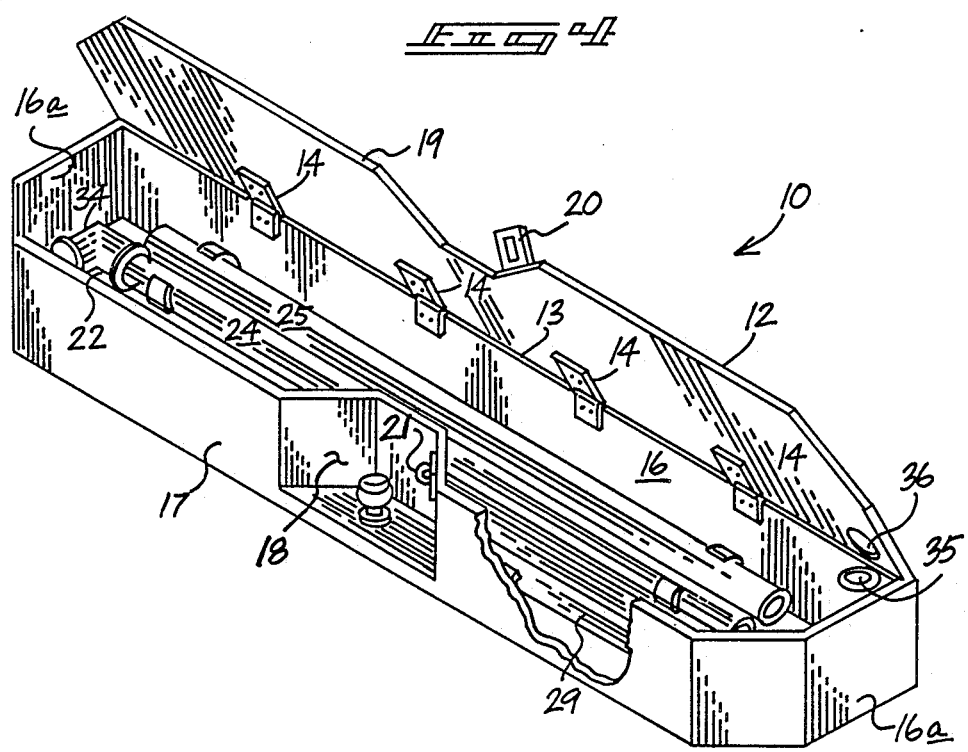

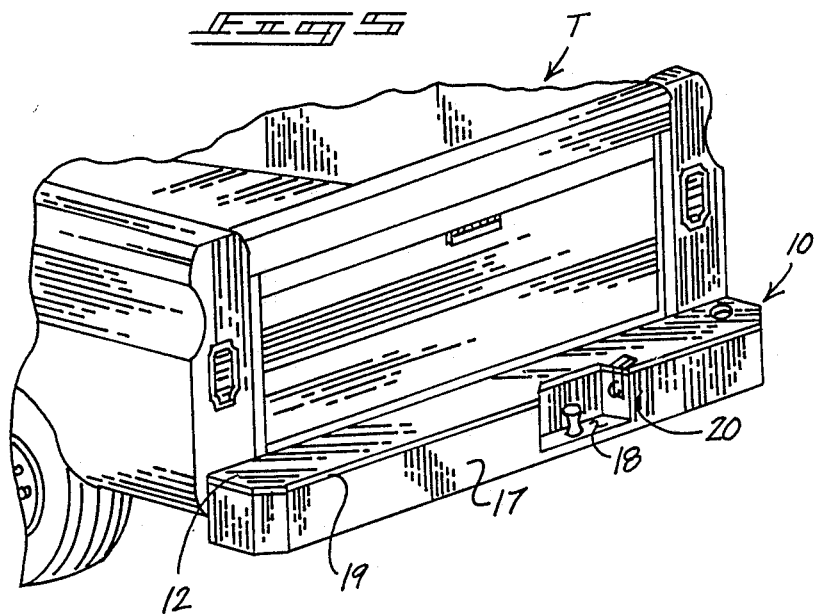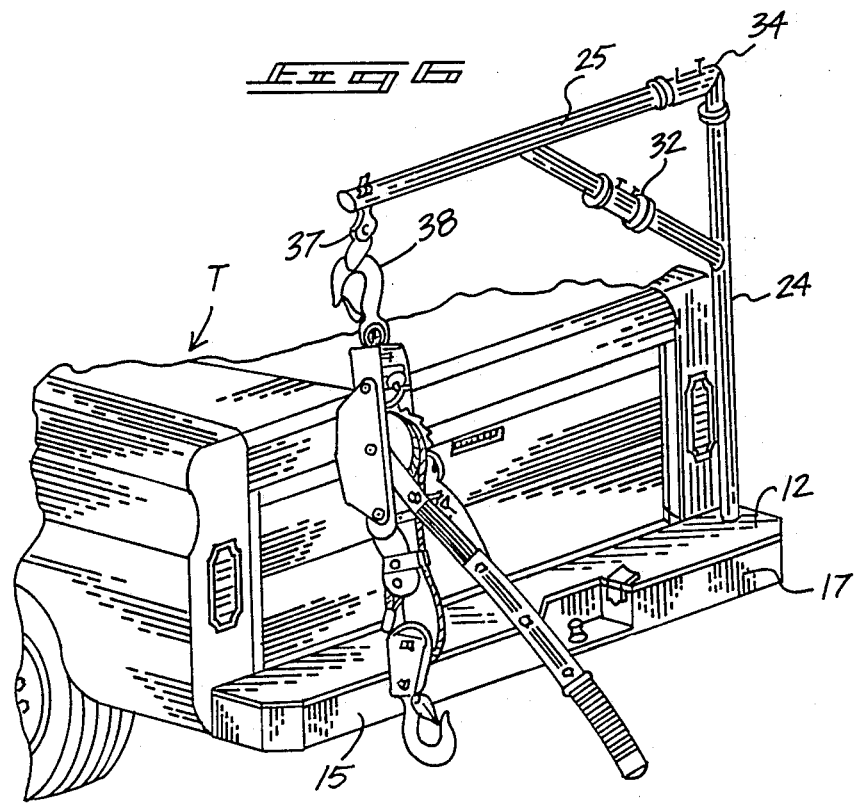

COMBINATION STEP BUMPER AND HOIST APPARATUS

BACKGROUND OF THE INVENTION

1. Field of the Invention

The field of invention relates to step bumpers, and more particularly pertains to a new and improved combination step bumper and hoist apparatus wherein the same may be readily assembled upon removal interiorly of the step bumper for use as a hoist arrangement.

2. Description of the Prior Art

The use of step bumpers in various organizations for particular application is well known in the prior art. Heretofore, the step bumpers have been utilized in instances as a storage and receptacle container for the use of tools and the like. The prior art, however, has heretofore failed to provide a hoist arrangement which is readily assembled to the step bumper and positions the hoist at a convenient elevation relative to a load to be lifted, such as an engine and the like. Examples of the prior art include Helber U.S. Pat. No. 4,674,782 to wherein a step bumper is provided with a storage interior with an overlying pivoted lid for use in storage of various articles.

Dent U.S. Pat. No. 3,614,136 provides a step bumper and tool box wherein the tool box is secured within the step bumper and the step bumper includes a latch mechanism to latch the lid relative to the bumper to prevent tampering with the tool box therewithin.

Robinson U.S. Pat. No. 4,127,295 sets forth a combination bumper and winch arrangement wherein the winch is positioned in a concealed manner within the step bumper.

Brown U.S. Pat. No. 4,473,334 illustrates a step bumper utilizing hydraulic mechanisms in combination with a yoke that is secured and mounted interiorly of the truck bed for the lifting and removal of vehicles.

Reich U.S. Pat. No. 4,487,446 illustrates a step bumper utilizing a chamber that stores a supply of compressed air that may be utilized for subsequent inflation of tires and the like.

As such, it may be appreciated that there is a continuing need for a new and improved combination step bumper and hoist apparatus wherein the same may be readily stored during periods of non-use and wherein the hoist may be conveniently and effectively erected and secured to the step bumper during periods of need.

SUMMARY OF THE INVENTION

In view of the forgoing disadvantages inherent in the known types of step bumpers now present in the prior art, the present invention provides a combination step bumper and hoist apparatus wherein the same utilizes a disassembled hoist arrangement secured within a step bumper that may be readily removed during periods of need. As such, the general purpose of the present invention, which will be described subsequently in greater detail, is to provide a new and improved combination step bumper and hoist apparatus which has all the advantages of the prior art step bumpers and none of the disadvantages.

To attain this, the present invention comprises a storage step bumper utilizing a lid pivotally mounted to a rear wall of the step bumper which may be latched thereto. The step bumper includes plural pairs of spring latches aligned relative to one another and secured to a floor of the bumper for storage of support rods therewithin. The support rods are assemble to provide an "L" shaped hoist which may be secured to the step bumper by directing a lower terminal end of a first support post through an aperture within the lid that is coaxially aligned with and of an equal diameter to a support cylinder that is integrally formed at an intersection of a rear wall and side wall of the step bumper.

My invention resides not in any one of these features per se, but rather in the particular combination of all of them herein disclosed and claimed and it is distinguished from the prior art in this particular combination of all of its structures for the functions specified.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent construction insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved combination step bumper and hoist apparatus which has all the advantages of the prior art step bumpers and none of the disadvantages.

It is another object of the present invention to provide a new and improved combination step bumper and hoist apparatus which may be easily and efficiently manufactured and marketed.

It is a further object of the present invention to provide a new and improved combination step bumper and hoist apparatus which is of a durable and reliable construction.

An even further object of the present invention is to provide a new and improved combination step bumper and hoist apparatus which is susceptible of a low cost of manufacture with regard to both materials and labor, and which accordingly is then susceptible of low prices of sale to the consuming public, thereby making such combination step bumper and hoist apparatus economically available to the buying public.

Still yet another object of the present invention is to provide a new and improved combination step bumper and hoist apparatus which provides in the apparatuses and methods of the prior art some of the advantages thereof, while simultaneously overcoming some of the disadvantages normally associated therewith.

Still another object of the present invention is to provide a new and improved combination step bumper and hoist apparatus wherein the same may be readily and conveniently contained within the step bumper wherein an included hoist arrangement is erected and secured to the step bumper during periods of need.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is a top orthographic view of the step bumper of the instant invention.

FIG. 2 is an orthographic frontal view taken in elevation of the step bumper of the instant invention.

FIG. 3 is an orthographic view taken in elevation of the hoist arrangement of the instant invention. FIG. 4 is an isometric illustration of the step bumper and hoist assembly of the instant invention.

FIG. 5 is an isometric illustration of the combination step bumper and hoist apparatus of the instant invention secured to a rear surface of a truck body.

FIG. 6 is an isometric illustration of the combination step bumper and hoist apparatus of the instant invention with the hoist erected and assembled to the step bumper.

DESCRIPTION OF THE PREFERRED EMBODIMENT

With reference now to the drawings, and in particular to FIGS. 1 to 6 thereof, a new and improved combination step bumper and hoist apparatus embodying the principles and concepts of the present invention and generally designated by the reference numeral 10 will be described.

More specifically, it will be noted that the combination step bumper and hoist apparatus 10 of the instant invention essentially comprises a step bumper 11 releasably mounting a hoist assembly therein as illustrated in FIG. 3, wherein the step bumper 11 includes a hingedly mounted lid 12 utilizing plural pairs of hinges 14 to mount the lid 12 to a rear wall 16 of a receptacle storage container 15 with the hinges 14 mounted adjacent an elongate rear edge 13 of the lid 12 and the rear wall 16 of the container 15. The container includes sides walls 16a, a forward wall 17, and a receptacles container floor 22. The forward wall 17 includes a recess 18 directed interiorly and medially of the forward wall 17 aligned with a notched forward lid edge 19 wherein the lid at the lid edge 19 includes a first latch member 20 cooperating with a second latch member 21 secured within the recess of the forward wall 17 to enable locking of the lid relative to the storage container 15.

Integrally secured to the receptacle container floor 22 are aligned pairs of spring latches including a first spring latch pair 23 of a width substantially twice that of a first or second post 24 and 25 respectively to receive the posts 24 and 25 in an aligned coextensive relationship, as illustrated in FIG. 4. The first post 24 is formed with a lower terminal end 24a with an upper end thereof receiving an elbow 34 that in turn may engage and receive a second post 25 therewithin. Latch pins 33 are received within apertures aligned with the latch pins 33 that are directed orthogonally through the elbow 34 to interlock the first and second posts 24 and 25 to the elbow 34 and to one another, as illustrated in FIG. 3 for example. A second spring latch pair 26 and a third spring latch pair 27 are each aligned and spaced relative to one another and integrally secured to the container floor 22 forwardly of the first spring latch pair 23 to respectively receive a third post 28 and a fourth post 29. A first stub shaft 31 is integrally secured at an acute angle to the first post 24 with a second stub shaft 30 integrally secured at an acute angle to the second post 25 that each accommodates the respective third and fourth posts 28 and 29 slidingly thereover and thereby orient and form a support triangle using the third and fourth posts 28 and 29 and the included portions of the first and second posts 24 and 25, as illustrated in FIG. 3. A sleeve member 32 utilizing latch pins 33 interengages and locks the respective third and fourth posts together as the sleeve member 32 receives the third and fourth posts 28 and 29 therewithin.

Integrally secured and orthogonally directed to the receptacle container floor 22 at an intersection of the rear wall 16 and a side wall 16a is a support cylinder 35 of a predetermined diameter. A lid aperture 36 is aligned with the support cylinder 35 and defines a diameter equal to the predetermined diameter. The predetermined diameter is the internal diameter of the support cylinder 35 and is equal to the external diameter of the first post 24 to enable the first post 24 to be received within the support cylinder 35 through the lid aperture 36 and may be rotatably mounted within the support cylinder 35 to enable the hoist arrangement to be pivotally angularly oriented relative to the storage container 15 and the associated truck "T". Diametrically and orthogonally secured through a remote terminal end of the second post 25 is a support ring 37 that receives a power puller 38 to enhance the lifting of various objects. The Power Puller 38 may be of manual or electrical motivation, as is typical of such devices for the lifting of various objects, such as engines and the like, for deposit within the truck bed of the truck "T".

As to the manner of usage and operation of the instant invention, the same should be apparent from the above disclosure, and accordingly no further discussion relative to the manner of usage and operation of the instant invention shall be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A combination step bumper and hoist apparatus for securement to an automotive vehicle, comprising, a storage container including a floor, a forward wall, and a rear wall spaced from said forward wall wherein said storage container is adapted for securement to said vehicle, and spaced side walls, a lid overlying said floor and of a complementary configuration to said floor including a rear edge spaced from a forward edge, said rear edge hingedly mounted to said rear wall, and a hoist assembly, and clip means projecting from the floor of the storage container for resilient securement of the hoist assembly, and wherein the hoist assembly includes a first post, a second post, a third post, and fourth post, the posts disassembled in a first orientation for securement within the clip means, and the posts assembled in a second orientation to define an erected hoist assembly, and including an "L" shaped elbow mounted to an upper terminal end of the first post, the elbow receiving a first end of the second post therewithin, and the first post including a first stub shaft oriented at an acute angle to the first post, and the second post including a second stub shaft oriented at an acute angle to the second post, and the first stub shaft arranged for reception within the third post, and the second stub shaft arranged for reception within the fourth post, the third and fourth posts aligned relative to one another when the third and fourth posts are respectively secured to the first and second stub shafts, and a sleeve including lock pins for receiving and aligning the third and fourth posts at remote ends from the first and second stub shafts, and wherein the elbow includes a plurality of lock pins for locking the first and second posts therewithin, and wherein the clip means includes a first spring latch pair aligned relative to one another and the first spring latch pair spaced a distance substantially equal to the combined widths of the first and second posts, and wherein the first post, the second post, the third post, and the fourth post are each of a length less than that defined by the floor of the storage container, and wherein the clip means further includes a second spring latch pair and a third spring latch pair for respectively receiving the third post and fourth post resiliently therewithin, and including a support cylinder integrally and orthogonally secured to the floor of the storage container and positioned adjacent an intersection defined by the rear wall and a side wall of the storage container, and further including a through-extending aperture formed through the lid wherein the aperture is coaxially aligned with the support cylinder when the lid is arranged parallel and overlying the floor of the storage container.

2. A combination step bumper and hoist assembly as set forth in claim 1 wherein the support cylinder is of a predetermined internal diameter substantially equal to a diameter defined by the aperture, and substantially equal to a further diameter defined by the first post for slidingly receiving the first post through the aperture and within the support cylinder.

3. A combination step bumper and hoist assembly as set forth in claim 2 wherein the second post includes a hook orthogonally secured to the second post at an end remote from the elbow when the second post is secured within the elbow, the hook arranged for securement of a winch thereto.

* * * * *